July 24, 1923.

E. J. EVANS

SIEVE

Filed April 18, 1922

1,462,804

Inventor
Edward James Evans

By Cushman, Bryant & Darby
Attorneys

Patented July 24, 1923.

1,462,804

UNITED STATES PATENT OFFICE.

EDWARD JAMES EVANS, OF BRIERCREST, SASKATCHEWAN, CANADA.

SIEVE.

Application filed April 18, 1922. Serial No. 554,942.

*To all whom it may concern:*

Be it known that EDWARD JAMES EVANS, a subject of the King of Great Britain, residing at Briercrest, in the Province of Saskatchewan and Dominion of Canada, has invented new and useful Improvements in Sieves, of which the following is a specification.

This invention relates to improvements in sieves and has for its object to provide an improved sieve more specifically adapted to be operated in connection with threshers.

Further objects are to provide a sieve which consists of a plurality of angle shaped sifting members pivotally mounted in a framework and designed to be set at a suitable inclination.

Still further objects are to provide an improved sieve which is simple in construction, not liable to go out of repair and generally adapt the several parts to better perform the functions required of them.

Figure 1:
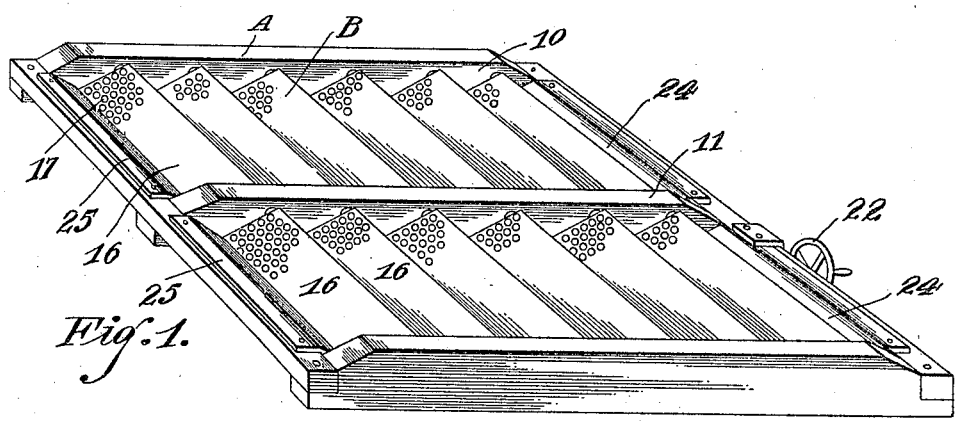
Figure 1 is a perspective view of the improved sieve.
Figure 2:
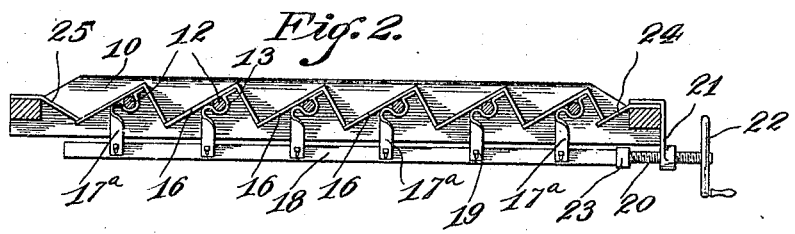
Figure 2 is a transverse section showing the sifting members in closed position.

Referring to the drawings:

A represents the improved sieve which comprises a frame 10 rectangular in cross section and designed to be separated in two parts by a metal member or web 11. Mounted in the end members and extending through the web 11 are a plurality of spindles 12 suitably spaced therefrom and designed to carry the sifting members B. Each of the sifting members B is mounted on the spindles 12 by means of rivets 14 and 15. If desired, the rivet 15 may extend through the spindle 12 so that the sifting member will move together with the spindle 12. Each of the sifting members B consists of an L-shaped plate 16 provided with a plurality of perforations 17 and 17' through which the fine grain is designed to pass. The metal strips 13 are each formed with an extension 17ª which is turned at right angles thereto and extends downwardly. Each of the L shaped members 16 carries a downward perforated extension 17' and all downward extensions 17ª of the straps 13 are designed to be connected to a transverse rod 18 through a suitable medium 19. The rod 18 is formed at one end with a shank 20 suitably secured thereto and which extends through a fixed internally threaded collar 21. The collar 21 is fixedly carried by the frame 10 and the rotary movement of the shank 20 within the threaded collar 21 causes the rod 18 to move forwardly or backward according to the direction in which the shank is turned within the collar. The outer end of the shank 20 is provided with a hand wheel 22 by means of which the rod may be suitably operated. The shank 20 is connected to the rod 18 by means of a connecting ring 23 which being fixed to the rod 18 loosely engages the end of the shank 20. If desired, the end of the shank 20 will be formed with an enlarged portion which could be loosely retained by means of a flange provided on the connecting ring 23. The space formed between the framework 10 and the first and last of the series of sifting members B may be bridged by means of deflector plates 24 and 25 over which the grain and chaff is fed on to the sifting members B.

Figure 3:
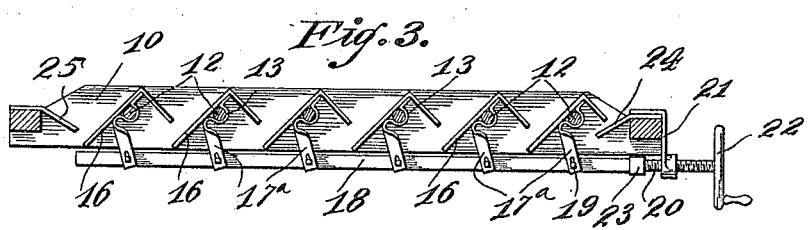
Figure 3 is a transverse section showing the sifting members in inclined position.
Figure 4:
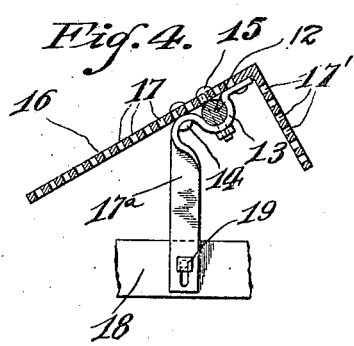
Figure 4 is an enlarged cross section through one of the sifting members.
Figure 5:
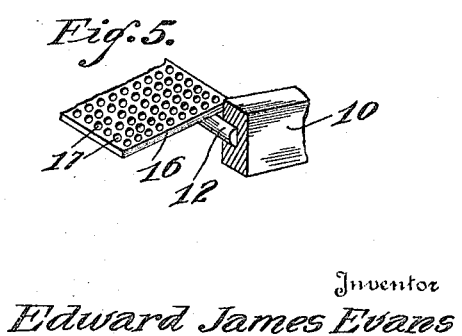
Figure 5 is a perspective detail of one of the sifting members.

When in operation, the hand wheel 22 is manipulated in order to bring the sifting members B to the desired inclination, as shown in Figure 3. When the threshing machine is in operation, the draft caused by the blower will be deflected by the inclined plates 16 of the sifting members B and will force the chaff out while the heavier grain will fall through the sieve on to the collecting pan.

It will be seen that by reason of the perforations 17 and 17', the air will pass through the body and the extension portion in a direction substantially perpendicular to their surfaces which will tend to raise all light material from the plate. By the proper regulating of the inclination of the plate 16 through the instrumentality of the rod 18, the grain will not be hindered from passing through the perforations and also through whatever space there may be found desirable to leave between the body of the plates and the angular extension of the adjacent plate.

The pressure caused by the various sources of air against one another will effectively destroy any eddies that may form between the perforations, while the component current thus produced will be directed in an upward and forward dirction so as to carry the chaff away, which customarily forms on the plates.

As many changes could be made in the above construction and many widely different embodiments of my invention within the scope of the claims, constructed without departing from the spirit or scope thereof, it is intended that all matter contained in the accompanying specification and drawings shall be interpreted as illustrative and not in a limiting sense.

What I claim as my invention is:

1. A sieve comprising a frame, spaced apart spindles in said frame, supporting plates having angularly bent portions, perforations in said plates and said angular portions substantially perpendicular to their surfaces for preventing eddies collecting between the perforations, and means connected to said plates for actuating the same.

2. A sieve comprising a frame, a plurality of spindles spaced in said frame, substantially L-shape perforated plates journalled on said spindles and arranged to have normally inclined lapping edges, means for conducting air current upward and forward through said plates, and means to operate the plates and to set them at any desired inclination.

3. A sieve comprising a frame, a plurality of spindles spaced in said frame, substantially L-shape perforated plates journalled on said spindles and arranged to have normally inclined lapping edges, means for removing the chaff from said plates, and an actuating rod operatively associated with said plates for moving the plates to any desired inclination.

4. The combination with a sieve having a frame, of a plurality of spaced apart spindles secured to the sides of said frame, substantially L-shape plates journalled in said spindles, perforations in said plates perpendicular to the surfaces of said plates, deflecting members connected to the ends of said frame, a longitudinally extending rod operatively connected with said plates for setting them at any desired inclination, and means for conducting air currents through said plate in an upward and forward direction.

In testimony whereof I have hereunto set my hand.

EDWARD JAMES EVANS.

Witnesses:
  W. A. BEYNON,
  AUDREY KNUTTON.